(12) United States Patent
Lin et al.

(10) Patent No.: US 7,537,293 B2
(45) Date of Patent: May 26, 2009

(54) VEHICLE STABILITY ENHANCEMENT CONTROL ADAPTATION TO DRIVING SKILL

(75) Inventors: William C. Lin, Troy, MI (US); Yuen-Kwok Chin, Troy, MI (US); Manxue Lu, Wyoming, OH (US)

(73) Assignee: GM Global Technology Operations, Inc., Detroit, MI (US)

( * ) Notice: Subject to any disclaimer, the term of this patent is extended or adjusted under 35 U.S.C. 154(b) by 456 days.

(21) Appl. No.: 11/398,952

(22) Filed: Apr. 6, 2006

(65) Prior Publication Data

US 2007/0145819 A1 Jun. 28, 2007

Related U.S. Application Data

(60) Provisional application No. 60/753,354, filed on Dec. 22, 2005.

(51) Int. Cl.
*B60T 8/60* (2006.01)
*B60T 8/24* (2006.01)
(52) U.S. Cl. ........................ 303/146; 701/72
(58) Field of Classification Search ............. 303/140, 303/146, 147; 701/36, 41, 44, 77, 98, 72
See application file for complete search history.

(56) References Cited

U.S. PATENT DOCUMENTS

| 6,308,122 | B1 * | 10/2001 | Nishizaki et al. | 701/41 |
| 2001/0056317 | A1 * | 12/2001 | Nishizaki et al. | 701/41 |
| 2004/0249533 | A1 * | 12/2004 | Wheals et al. | 701/36 |
| 2005/0131597 | A1 * | 6/2005 | Raz et al. | 701/29 |
| 2005/0234626 | A1 * | 10/2005 | Shiiba et al. | 701/70 |
| 2007/0244606 | A1 * | 10/2007 | Zhang et al. | 701/1 |

OTHER PUBLICATIONS

Proceedings of the American Control Conference, Liang-kuang Chen et al., Indentification of a Nonlinear Drive Model via NARMAX Modeling, Jun. 2000, pp. 2533-2537.*

* cited by examiner

*Primary Examiner*—Thomas J Williams

(57) ABSTRACT

A vehicle stability enhancement (VSE) system that is adapted for driver skill level. The system includes a driver skill recognition processor that determines the driver skill level based on a driver model that uses certain parameters, such as a steering gain factor and a time delay factor. The driver skill level is used to adjust the damping ratio and natural frequency in dynamic filters in a dynamic command generator to adjust a desired yaw rate signal and a desired side-slip signal. The driver skill level is also used to generate a yaw rate multiplication factor and a side-slip multiplication factor that modify a yaw rate stability signal and a side-slip stability signal in a dynamic control computation processor that generates a stability control signal.

19 Claims, 9 Drawing Sheets

VEHICLE STABILITY ENHANCEMENT CONTROL ADAPTATION TO DRIVING SKILL

CROSS REFERENCE TO RELATED APPLICATIONS

This application claims the benefit of the priority date of U.S. Provisional Patent Application No. 60/753,354, titled Vehicle Stability Enhancement Control Adaptation to Drive Skill, filed Dec. 22, 2005.

BACKGROUND OF THE INVENTION

1. Field of the Invention

This invention relates generally to a vehicle stability control system and, more particularly, to a vehicle stability control system that employs driver skill recognition to enhance the control.

2. Discussion of the Related Art

Modern vehicles sometimes incorporate active vehicle control systems. One such system is known as a vehicle stability enhancement (VSE) system that assists the vehicle operator in providing vehicle handling on surfaces such as wet or uneven pavement, ice, snow or gravel. The VSE system typically senses wheel skid based on inputs from a wheel speed sensor, a steering angle sensor, a vehicle speed sensor and a vehicle yaw rate sensor. The VSE system uses these inputs to reduce engine torque and apply differential braking to help maintain the vehicle travel along the intended path.

Additionally, active chassis control systems have been emerging in the art that are used in combination with VSE systems. The chassis control systems typically include differential braking control, real-time suspension damping, rear-wheel steering and active front steering control. With the capability of controlling chassis dynamics in real time, the active chassis control systems can be used to enhance the vehicle handling performance.

Another active vehicle control system is known as an active front steering (AFS) system that provides automatic front-wheel steering. AFS systems typically employ a steering actuator system that receives an operator intended steering signal from a hand-wheel sensor, a vehicle speed signal and a vehicle yaw rate signal, and provides a correction to the operator steering signal to cause the vehicle to more closely follow the vehicle operator's intended steering path to increase vehicle stability and handling. The AFS system is able to provide steering corrections much quicker than the vehicle operator's reaction time, so that the amount of operator steering is reduced. The AFS system provides a more direct vehicle steering under normal road conditions at low and medium speeds, reducing operator steering effort. The AFS system also may help to increase vehicle agility in city traffic or during parking maneuvers. The AFS system also provides less direct vehicle steering at higher vehicle speeds.

Vehicle driver skill levels come in a wide range. For novice or young drivers, it is desirable that the vehicle stability enhancement provide stability control as close as possible to the drivers intended path with minimal vehicle side-slip. However, for experienced or high performance drivers, a certain amount of side-slip is generally desirable because it increases the driving experience and enjoyability and allows more control for vehicle cornering. Therefore, it would be desirable to provide a vehicle stability enhancement system, or other vehicle stability control system, that could adapt to different driving skill levels so that the enhancement system performs suitably for drivers of all skill levels.

SUMMARY OF THE INVENTION

In accordance with the teachings of the present invention, a vehicle stability enhancement (VSE) system is disclosed that is adapted for driver skill level. The system includes a driver skill recognition processor that determines the driver skill level based on a driver model that uses certain parameters, such as a steering gain factor and a time delay factor. The driver skill level is used to adjust the damping ratio and natural frequency in dynamic filters in a dynamic command generator to adjust a desired yaw rate signal and a desired side-slip signal. The driver skill level is also used to generate a yaw rate multiplication factor and a side-slip multiplication factor that modify a yaw rate stability signal and a side-slip stability signal in a dynamic control computation processor that generates a stability control signal.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a vehicle stability enhancement system that is adapted for a driver's skill level is merely exemplary in nature, and is in no way intended to limit the invention or its applications or uses.

Figure 1:
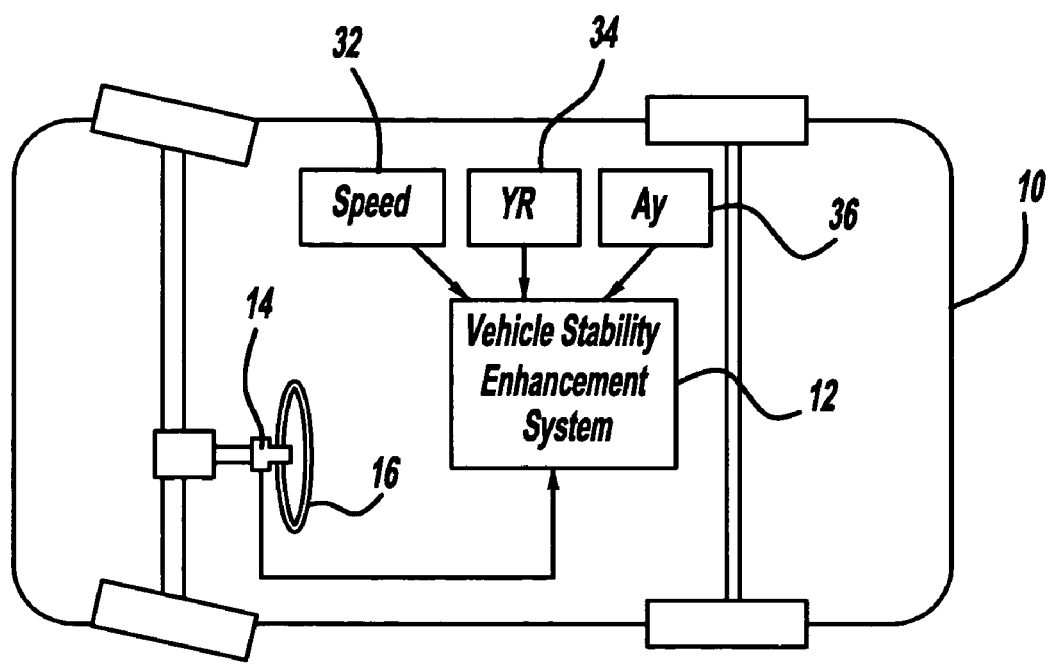
FIG. 1 is a plan view of a vehicle including various sensors and a vehicle stability enhancement (VSE) system, according to an embodiment of the present invention.

FIG. 1 is a plan view of a vehicle 10 including a vehicle stability enhancement (VSE) system 12, according to an embodiment of a present invention. The vehicle 10 includes a hand-wheel angle sensor 14 that provides a signal to the system 12 of the position of a vehicle hand-wheel 16. The vehicle 10 includes a vehicle speed sensor 32, a vehicle yaw rate sensor 34 and a vehicle lateral acceleration sensor 36 that provide a vehicle speed signal Vx, a vehicle yaw rate signal r and a vehicle lateral acceleration signal or side-slip velocity signal $V_y$, respectively, to the controller 12.

As will be discussed in detail below, the VSE system 12 includes a process for recognizing the driver's skill level so as to set yaw rate and side-slip gains accordingly to increase driver safety and enjoyability. State of the art characterization of driver skill level using a comprehensive model is feasible, but it does not provide a high level of confidence required for vehicle control adaptation. Apparently there are more of the driver attributes than simply the time factor of driver skill that can effectively determine the classification of driver skill level.

Figure 2:
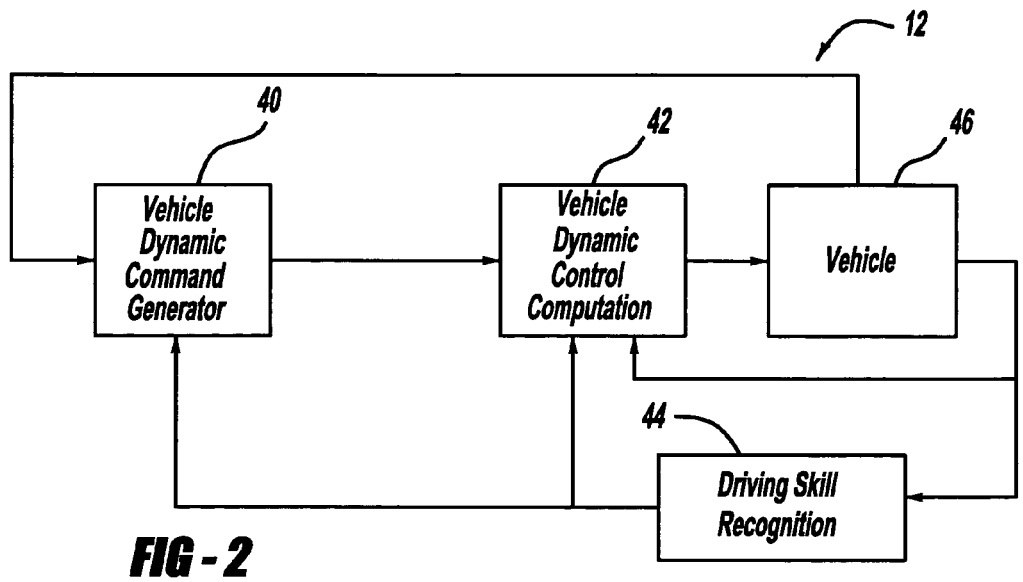
FIG. 2 is a block diagram of the VSE system shown in FIG. 1.

FIG. 2 is a block diagram of the VSE system 12 that includes a vehicle dynamic command generator 40 and a vehicle dynamic control computation processor 42. Both the command generator 40 and the control computation processor 42 receive a driver skill level signal from a driver skill recognition processor 44 that identifies the driver skill level, as will be discussed in detail below. As will also be discussed in detail below, the command generator 40 receives certain driver based signals from a vehicle 46 and provides a desired yaw rate signal r* and a desired side-slip velocity signal V*$_y$. The control computation processor 42 provides a VSE control signal that controls the desired systems in the vehicle 46, such as differential braking, active front steering, vehicle suspension, etc. The measured yaw rate signal r from the yaw rate sensor 34 and the measured side-slip velocity signal $V_y$ from the lateral acceleration sensor 36 are fed-back to the control computation processor 42 to provide a yaw rate error signal Δr between the desired yaw rate and the measured yaw rate and a side-slip error signal ΔVy between the desired side-slip velocity and the measured side-slip velocity. The yaw rate error signal Δr and the side-slip error signal ΔVy are used by the processor 42 to generate the VSE control signal.

Figure 3:
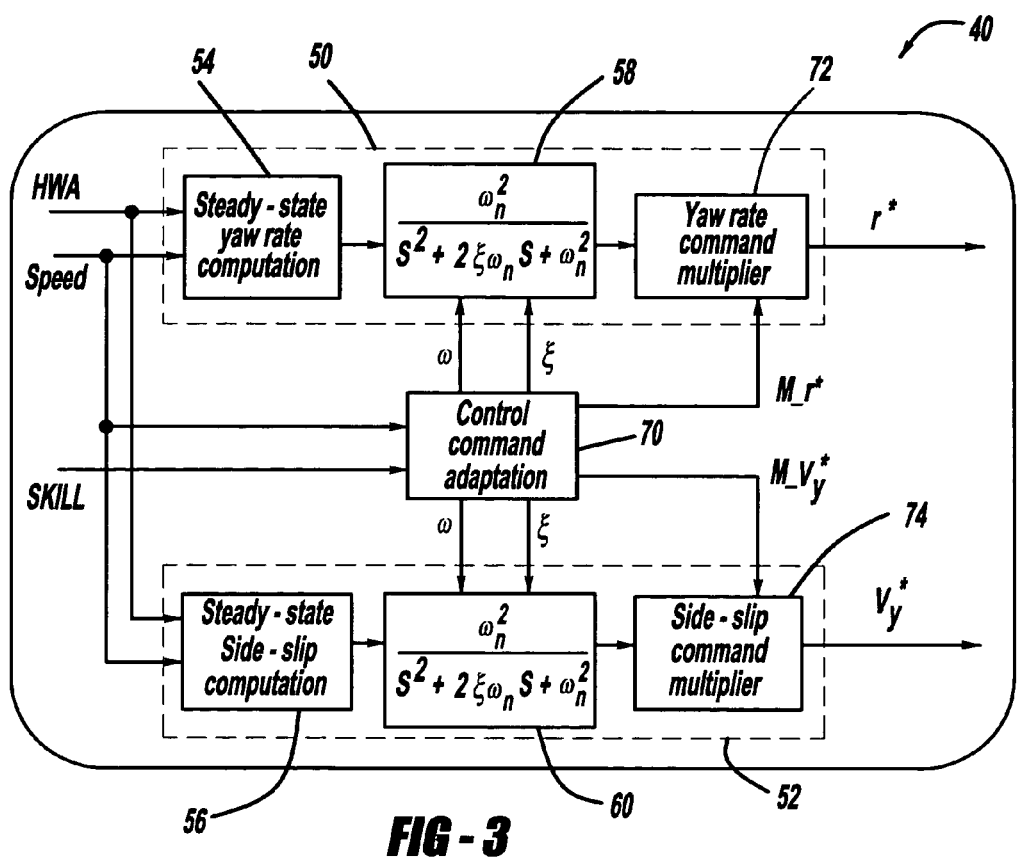
FIG. 3 is a block diagram of the vehicle dynamic command generator shown in the VSE system of FIG. 2.

FIG. 3 is a block diagram of the command generator 40. The command generator 40 includes a yaw rate command generator 50 that outputs the desired yaw rate signal r* based on the driver intent and a side-slip velocity command generator 52 that outputs the desired vehicle side-slip velocity signal V*$_y$ based on the driver intent. The yaw rate command generator 50 includes a steady-state yaw rate computation processor 54 and the side-slip velocity command generator 52 includes a steady-state side-slip computation processor 56 that receive the hand-wheel angle (HWA) signal from the sensor 14 and the vehicle speed signal Vx from the sensor 32. The yaw rate computation processor 54 includes a look-up table that provides a steady-state yaw rate signal based on the hand-wheel angle signal and the vehicle speed signal Vx and the side-slip computation processor 56 includes a look-up table that provides a steady-state side-slip signal based on the hand-wheel angle signal and the vehicle speed signal Vx. Those skilled in the art will readily recognize how to generate the look-up tables for this purpose.

The steady-state yaw rate signal is processed by a dynamic filter 58 in the generator 50 and the steady-state side-slip signal is processed by a dynamic filter 60 in the generator 52, where the dynamic filters 58 and 60 are second order filters characterized by a damping ratio ζ and a natural frequency $\omega_n$. In the known command generators for vehicle stability systems, the damping ratio ζ and the natural frequency $\omega_n$ are typically a function of vehicle speed. According to the invention, the dynamic filter 58 and the dynamic filter 60 receive a control command adaptation signal from a control command adaptation processor 70 that identifies the damping ratio ζ and the natural frequency $\omega_n$ for a particular driver skill level calculated by the driving skill recognition processor 44, as will be discussed in detail below. Particularly, the present invention proposes adapting the damping ratio ζ and the natural frequency $\omega_n$ in the filters 58 and 60 to the skill level of the driver so that the vehicle 46 will more closely follow the drivers intent for inexperienced drivers and will be more loose to provide some side-slip for experienced drivers. As will be discussed in more detail below, look-up tables can be used to identify the damping ratio ζ and the natural frequency $\omega_n$ based on the driver skill level and the vehicle speed signal Vx.

The control command adaptation processor 70 also generates a desired yaw rate multiplier M_r* and a desired side-slip multiplier M_V$_y$*, which can be generated from look-up tables based on driver skill, as will be discussed below. The filtered steady-state yaw rate signal from the dynamic filter 58 is multiplied by the desired yaw rate multiplier M_r* in a yaw rate command multiplier 84 to provide the desired yaw rate signal r* that has been influenced by the driver skill level. Likewise, the filtered steady-state side-slip signal from the dynamic filter 60 is multiplied by the desired side-slip multiplier M_V$_y$* in a side-slip command multiplier 74 to provide the desired side-slip velocity signal V$_y$* that has been influenced by the driver skill level.

Figure 4:
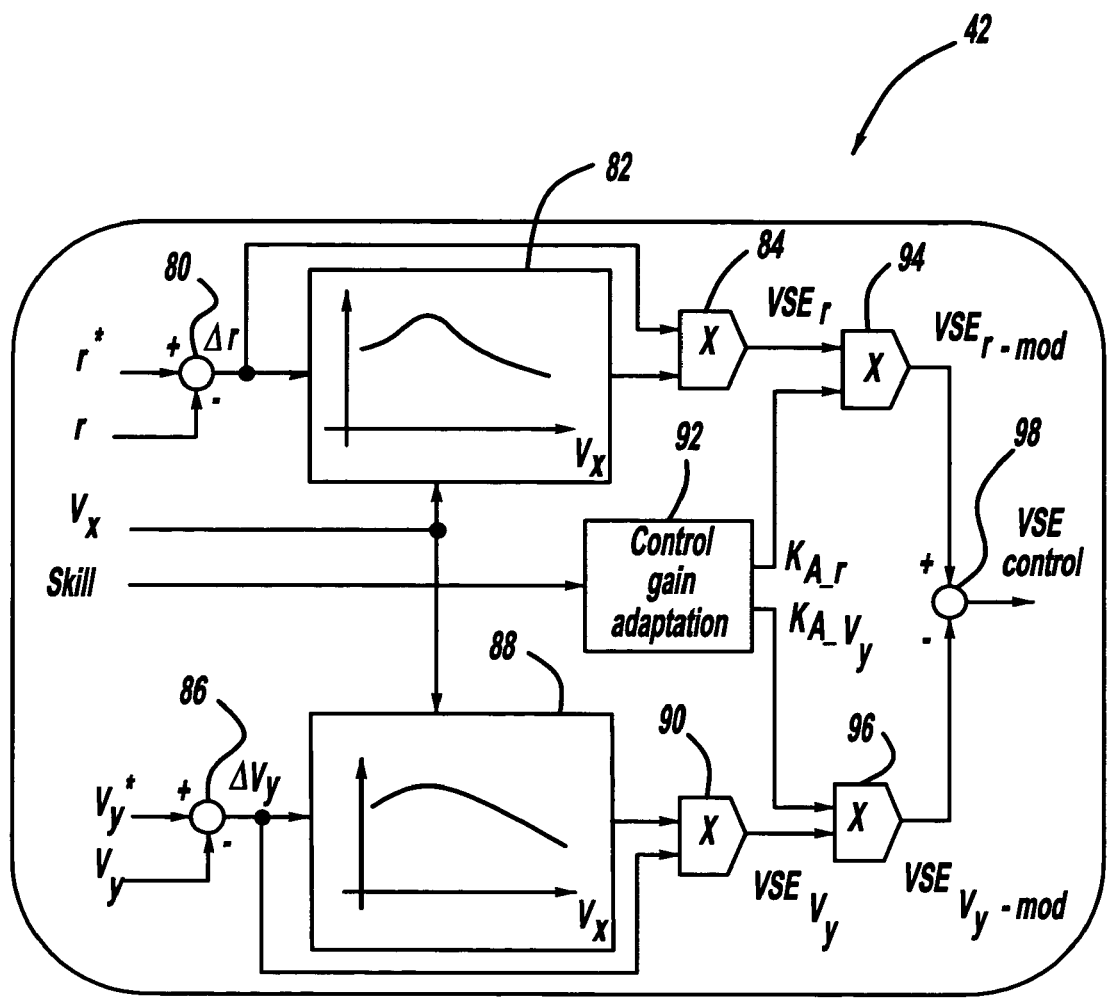
FIG. 4 is a block diagram of the vehicle dynamic control computation processor shown in the VSE system of FIG. 2.

FIG. 4 is a block diagram of the control computation processor 42 that receives the desired yaw rate signal r* and the desired vehicle side-slip velocity signal V$_y$* from the generators 50 and 52, respectively. The desired yaw rate signal r* and the measured yaw rate signal r from the sensor 34 are compared in a subtractor 80 to generate the yaw rate error signal Δr. The yaw rate error signal Δr and the vehicle speed signal Vx from the sensor 32 are applied to a look-up table 82 that provides a yaw rate control gain signal. The yaw rate control gain signal is multiplied by the yaw rate error signal Δr in a multiplier 84 to generate a yaw rate vehicle stability signal VSE$_r$. Likewise, the desired side-slip signal V$_y$* and the measured side-slip signal V$_y$ from the sensor 36 are compared in a subtractor 86 to generate the side-slip error signal ΔV$_y$. The side-slip error signal ΔV$_y$ and the vehicle speed signal Vx are applied to a look-up table 88 that provides a side-slip control gain signal. The side-slip control gain signal and the side-slip error signal ΔV$_y$ are multiplied by a multiplier 90 to generate a side-slip vehicle stability signal VSE$_{Vy}$.

In the known vehicle stability systems, the yaw rate vehicle stability signal VSE$_r$ and the side-slip vehicle stability signal VSE$_{Vy}$ were added to provide the VSE control signal. According to the invention, the calculated driver skill level signal is applied to a control gain adaptation processor 92 that determines a yaw rate multiplier factor K$_{A\_r}$ and a side-slip multiplier factor K$_{A\_Vy}$. The yaw rate stability signal VSE$_r$ and the multiplier factor K$_{A\_r}$ are multiplied by a multiplier 94 to generate a modified yaw rate stability signal VSE$_{r-mod}$, and the side-slip stability signal VSE$_{Vy}$ and the multiplier factor K$_{A\_Vy}$ are multiplied by a multiplier 96 to generate a modified side-slip stability signal VSE$_{Vy-mod}$. The modified yaw rate stability signal VSE$_{r-mod}$ and the modified side-slip stability signal VSE$_{Vy-mod}$ are then added by an adder 98 to provide the VSE control signal that controls the various stability enhancement components in the vehicle 46, such as differential braking and active steering in the vehicle 10, as discussed above.

Figure 5:
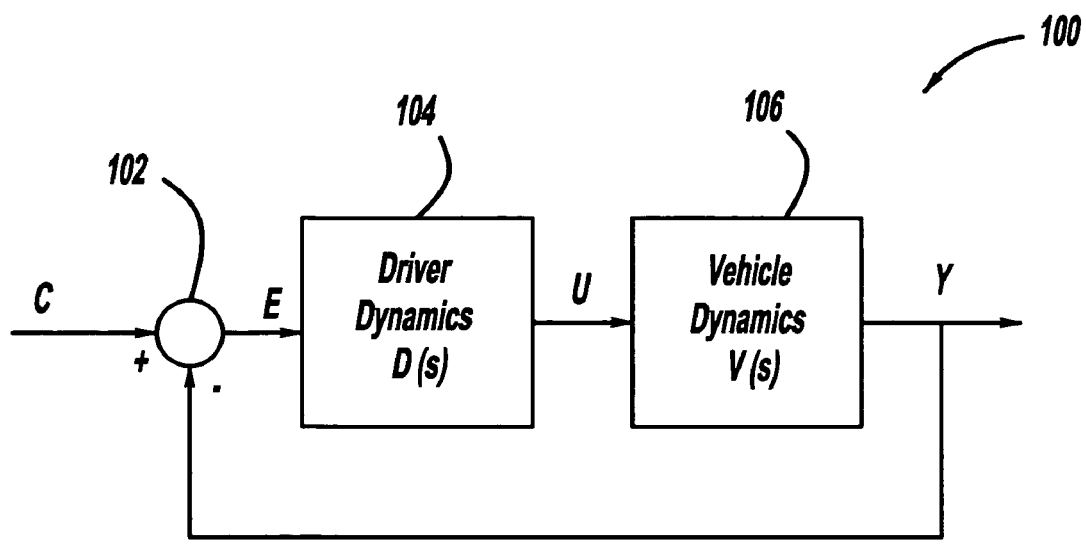
FIG. 5 is a functional diagram depicting a relationship between a driver and vehicle where the dynamics of the driver and the vehicle are characterized separately.

The following discussion describes the process of determining the driver skill level, according to one or more embodiments of the present invention. FIG. 5 is a block diagram of a closed-loop system 100 that shows the dynamics of a driver maneuvering a vehicle. In this example, the closed-loop system 100 receives a measured command C that may include the measured vehicle path, the measured yaw angle of the vehicle, the measured yaw rate of the vehicle, etc. The vehicle under control responds with a vehicle response output Y that is detected or felt by the driver. The driver then detects or estimates the discrepancy between the command C and the vehicle response output Y in a comparator 102 that provides a perceived error E that is the difference between the command C and the output Y. Based on the perceived error E between the command C and the vehicle response output Y, a driver dynamics D(s) module 104 calculates a corrected measure U. The corrected measure U is the input the driver provided, for example, the steering angle during a vehicle maneuver. With the corrected measure U and the existing vehicle inherent state, the vehicle response output Y is updated according to predetermined vehicle dynamics V(s) by a vehicle dynamics processor 106.

The central issue in the driver/vehicle interaction described above is how to characterize the driver behavior so that the total driver/vehicle dynamic behavior and response can be better understood to design a better vehicle dynamic control to be an integral part of the VSE system 12. One approach is illustrated in FIG. 5 where the vehicle dynamics processor 104 is described as part of a driver model, and the driver model contains various parameters to potentially characterize the driver's behavior. Such a process of characterizing the driver's behavior is known to those skilled in the art.

The driver dynamics model as depicted in the system 100 may contain many of the variables and processes potentially addressing all possible issues of the driver. These variables can be based on fundamental understanding of the driver's psychology and psychological capabilities and limitations. Such variables and processes may improve, for example, the driver's attention span ahead of the vehicle to preview the road and traffic conditions, the driver's capability to plan for a vehicle path, the driver's ability to sense the vehicle position along the path, the driver's decision process to determine the steering input path or the path error, and the driver's muscle reaction transport delay to the steering command. Some of these processes may require more variables and parameters to describe them in mathematical terms. Those skilled in the art of dynamic modeling will understand the magnitude of effort it requires to get all of the variables and parameters resolved through parameter identification and optimization before the model is complete. Nevertheless, such modeling does provide headway to the contribution of the art of driver skill modeling. By examining the driver's preview time and transport delay, it does find some useful information correlating these two parameters of various types of drivers.

Figure 6:
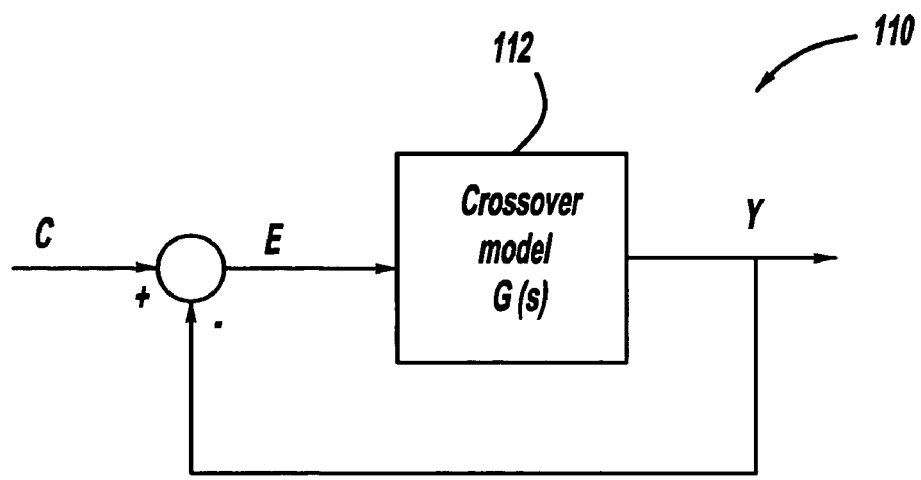
FIG. 6 is a functional diagram of a cross-over model where the dynamics of the driver and vehicle are consolidated for analysis of the driver's dynamic behavior.

Another technique for driver modeling is to treat the driver/vehicle system as one integral dynamic without trying to separate the individual contributions. For example, FIG. 6 depicts a modeling system 110 that employs a cross-over model processor 112. The cross-over model is representative of a simple form described by two major parameters, i.e., a cross-over frequency $\omega_c$ and a time delay $\tau$ as shown by equation (1).

$$G(s) = \frac{\omega_c}{s} e^{-\tau s} \quad (1)$$

This form is well recognized to those skilled in the art of driver modeling. With only two parameters to be identified, developing a driver model with representative parameters is viable using commonly accepted processes of optimization.

While it has been shown to be viable to model a specific driver using the approaches shown in the systems 100 and 110, the question remains whether these models can be used to characterize a driver's skill level based on the driving and vehicle performance. It is one purpose of the present invention to design a method utilizing these driver models to characterize the driving skill of the driver.

Referring to equation (1), where the composite dynamic of a driver and vehicle can be represented with two parameters of the cross-over frequency $\omega_c$ and the time delay $\tau$, it is also understood that the time delay is a factor relevant to the driver's skill level. Therefore, it is reasonable to use parameter identification processes to extract the time delay factor of drivers of known skill levels.

Although graphical results can be used as a model reference to be compared with each individual driver to tell whether a driver is a high-skill driver, an average driver or a low-skill driver, improvements on the accuracy of driver skill recognition can still be made. Among many possible alternatives of assessing the driver's skill in vehicle maneuvering, it has been suggested that the one possessing the most direct effect on the driver's steering control is the driver's mindset to decide the amount of corrective steering based on the perceived error, i.e., the vehicle-path error, vehicle-heading error or yaw rate error. This part of the mindset controlling the steering decision making can be translated into an engineering term as the driver's steering gain.

Realizing that the systems 100 and 110 are appropriate representations of the same driver/vehicle composite system, the cross-over frequency in equation (1) must contain the two major gains from the two constituents of the composite system as:

$$\omega_c = K_d K_v \quad (2)$$

Where $K_d$ represents the driver's steering gain and $K_V$ represents the vehicle steering gain. While the vehicle is invariant regardless of what driver is operating it, the vehicle steering gain $K_v$ can be predetermined according to known conditions of vehicle speed and other detectable environmental conditions. Therefore, if any variability can be extracted from the driver steering gain $K_d$ it will be instrumental to the recognition of the driver skill level.

Figure 7:
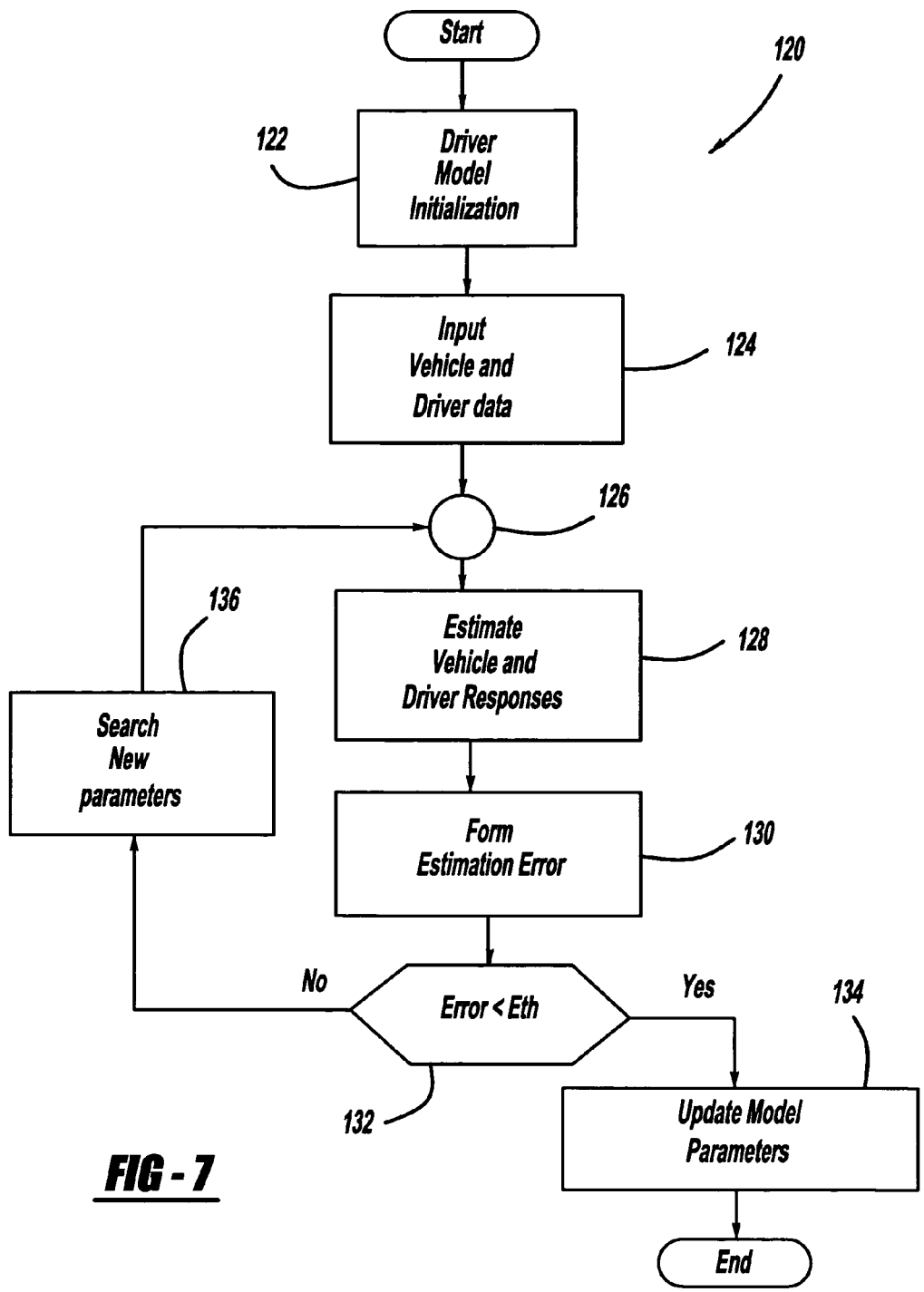
FIG. 7 is a flow chart diagram showing a process for identifying various parameters of a driver dynamic model, according to an embodiment of the present invention.

FIG. 7 is a flow chart diagram 120 showing a process for developing a driver model, as discussed above, with representative parameters using commonly accepted processes of optimization. The algorithm for generating the driver model first initializes the driver model at box 122 with preselected values. The algorithm then inputs the vehicle and driver data that may include any or all of the various values discussed above at box 124. The driver data represents the measured command C and the vehicle data represents a measured vehicle response Y*. The driver data C and the vehicle data Y* are then added to new parameters at circle 126, where the parameters define the driver skill level in the models referred to above. Based on the vehicle driver data and the parameters, the algorithm generates the estimated vehicle response Y at box 128. From the estimated response Y, the algorithm then forms an estimation error E at box 130 that is the difference between the estimation response Y and the measured vehicle response Y*. The algorithm then determines whether the error E is less than a threshold at decision diamond 132. If the error E is less than the predetermined error at the decision diamond 132, then the algorithm updates the model parameters at box 134. Otherwise, the algorithm provides new parameters at box 136 and returns to estimating the vehicle and driver responses at the box 128.

Taking into account the variability of the driver gain, and using the parameter optimization process shown in FIG. 7, a steering gain factor can be determined. As a result, a method of characterizing the driver skill level is provided according to the invention that utilizes both the time delay factor and the steering gain factor of a driver extracted from parameter optimization processes based on vehicle data measured by various sensors.

Figure 8:
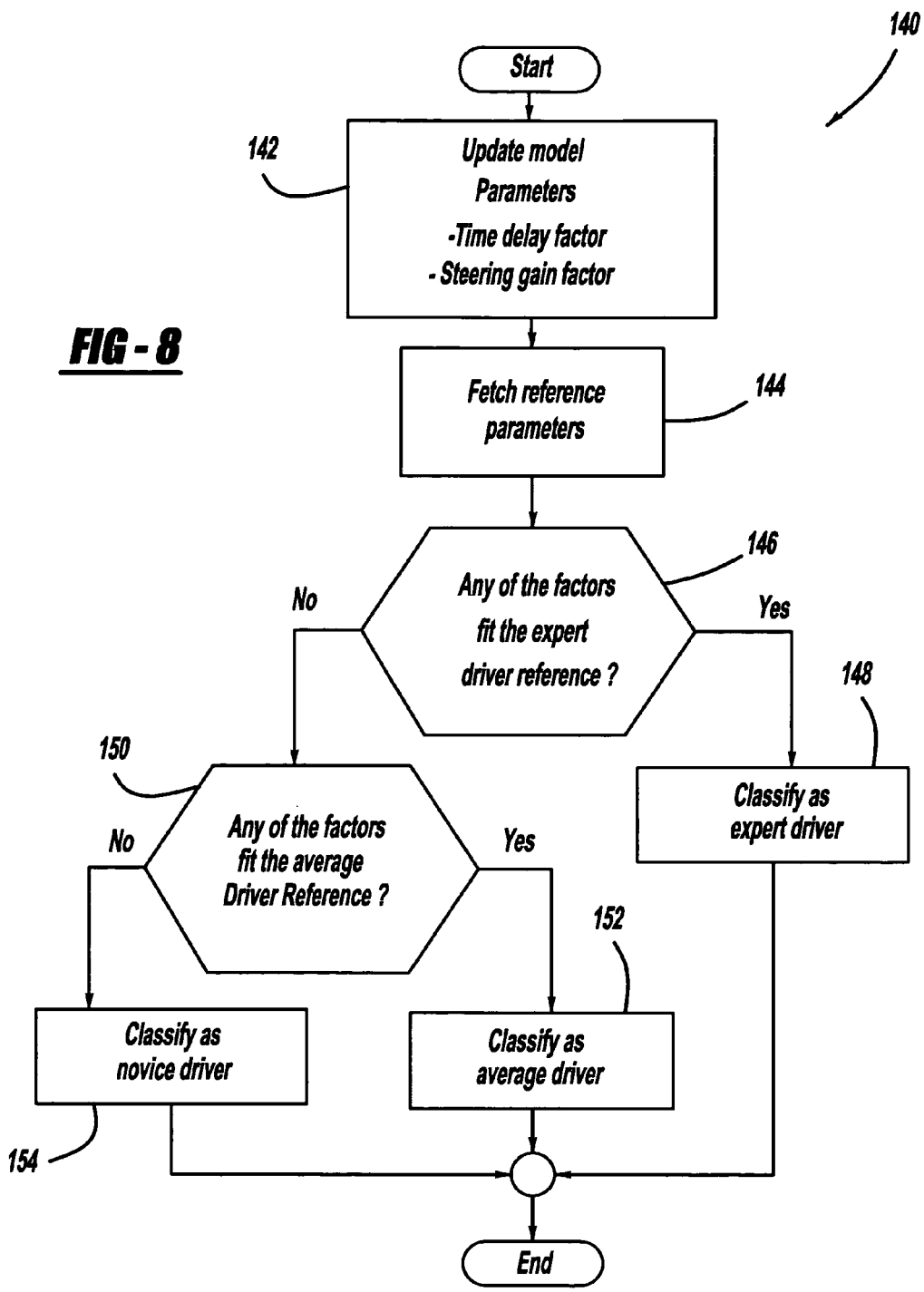
FIG. 8 is a flow chart diagram showing a process to more effectively recognize the driver skill level of a vehicle driver, according to an embodiment of the present invention.

FIG. 8 is a flow chart diagram 140 depicting this process. The algorithm updates the model parameters including the time delay factor and the steering gain factor from FIG. 7 at box 142. The algorithm then determines reference parameters at box 144. The algorithm then determines if the time delay factor or the steering gain factor fit the parameters for an expert driver at decision diamond 146, and if so classifies the driver as an expert driver at box 148. If the time delay factor and the steering gain factor do not fit the parameters for an expert driver at the decision diamond 146, then the algorithm determines whether the factors fit the parameters for an average driver at decision diamond 150. If the factors do fit the parameters for the average driver at the decision diamond 150, then the algorithm classifies the driver as an average driver at box 52, otherwise it classifies the driver as a novice driver at box 154.

It should be noted that while this invention illustrates a method of extracting a driver's steering gain factor to work with the time delay factor, the method should not be restricted to using those specific parameters as other parameters may be equally applicable. Those skilled in the art of driver modeling would recognize utilizing the steering gain factor is also equivalent to utilizing a steering cost factor when the decision-making process of the steering command is modeled by an optimal control problem. The steering cost factor can then be utilized in conjunction with the time delay factor or any time factor, such as transport delay and preview time to effectively characterize the driving skill of the driver.

The implementation of the process can be made using on-board vehicle controllers including a micro-computer taking measurements of the vehicle dynamic information and driver's action, such as steering angle, vehicle speed, vehicle yaw rate, vehicle lateral acceleration, and any signal those skilled in the art of vehicle dynamics can use. For those vehicles equipped with a GPS receiver, the vehicle path and heading angle can also be measured to include the accuracy of driving skill recognition.

The output of the driving skill recognition processor 44 is the driving skill classification achieved from FIG. 8. This value is then input into the control command adaptation processor 70 and the control gain adaptation processor 92.

Figure 9:
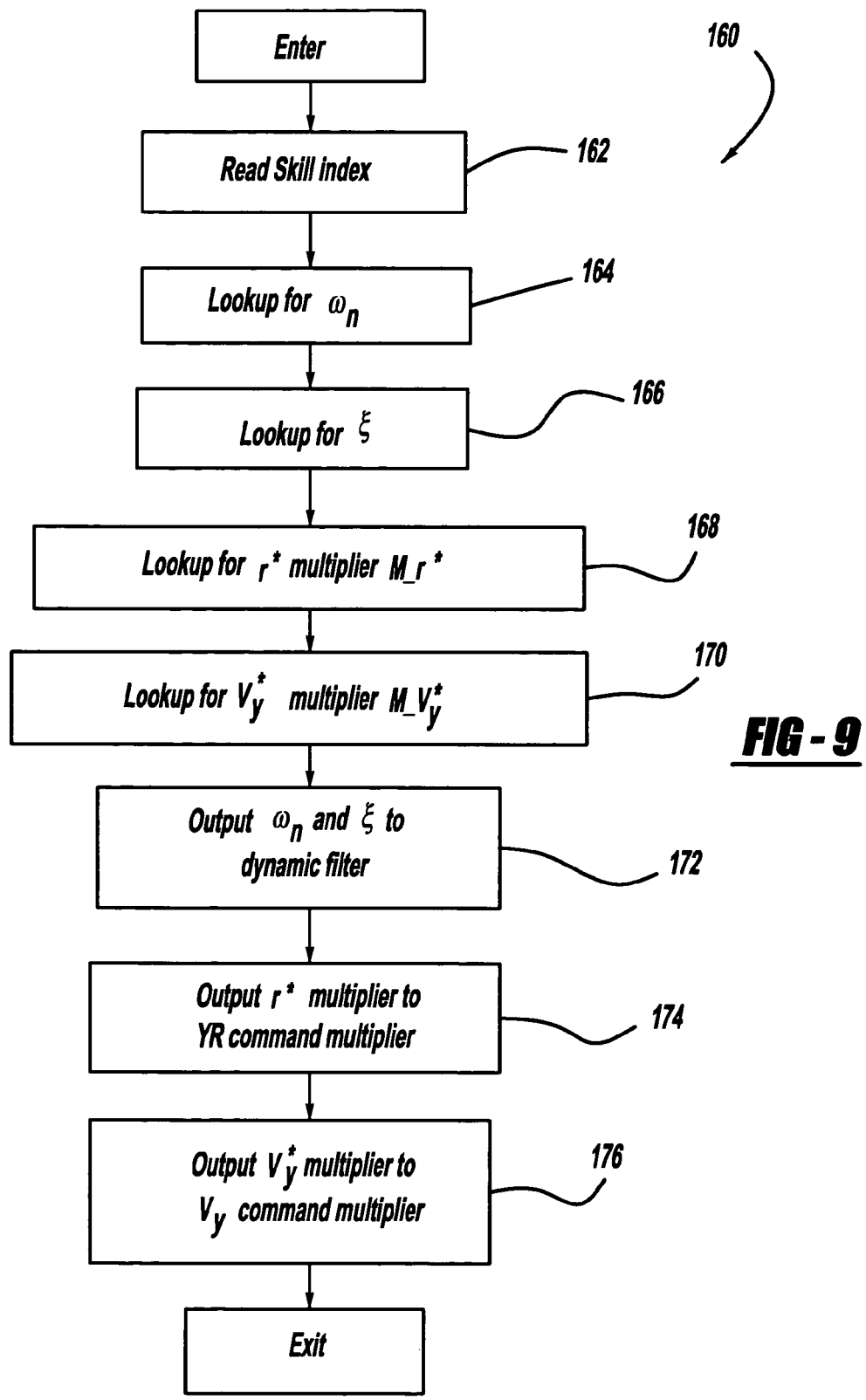
FIG. 9 is a flow chart diagram showing a process for determining the desired yaw rate and the desired side-slip in the vehicle dynamic command generator shown in FIG. 3, according to an embodiment of the present invention.
Figure 10:
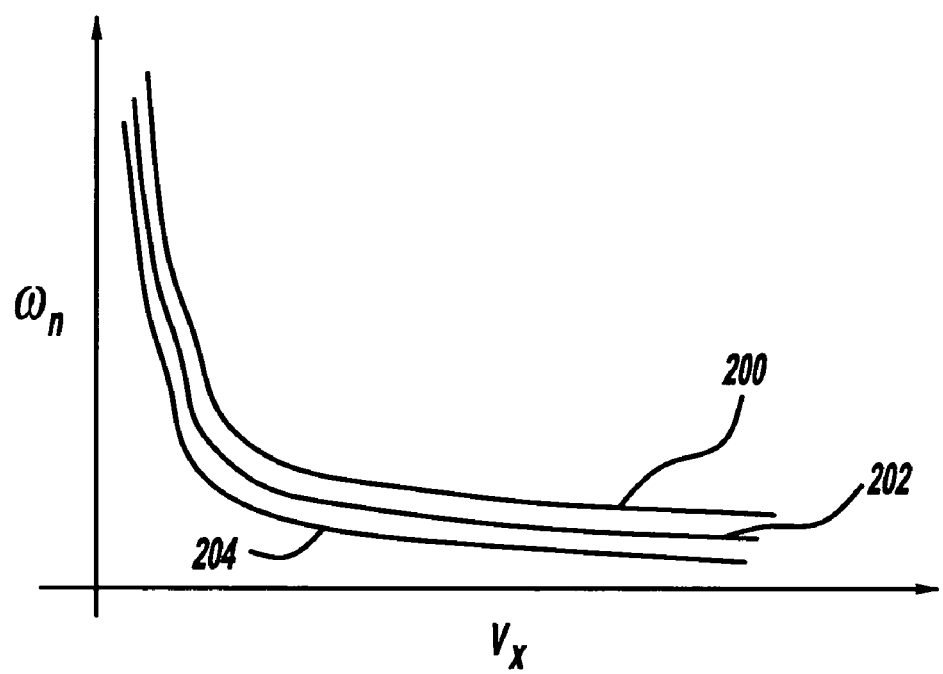
FIG. 10 is a graph with vehicle speed on the horizontal axis and natural frequency on the vertical axis used to provide the natural frequency based on driver skill and vehicle speed.
Figure 11:
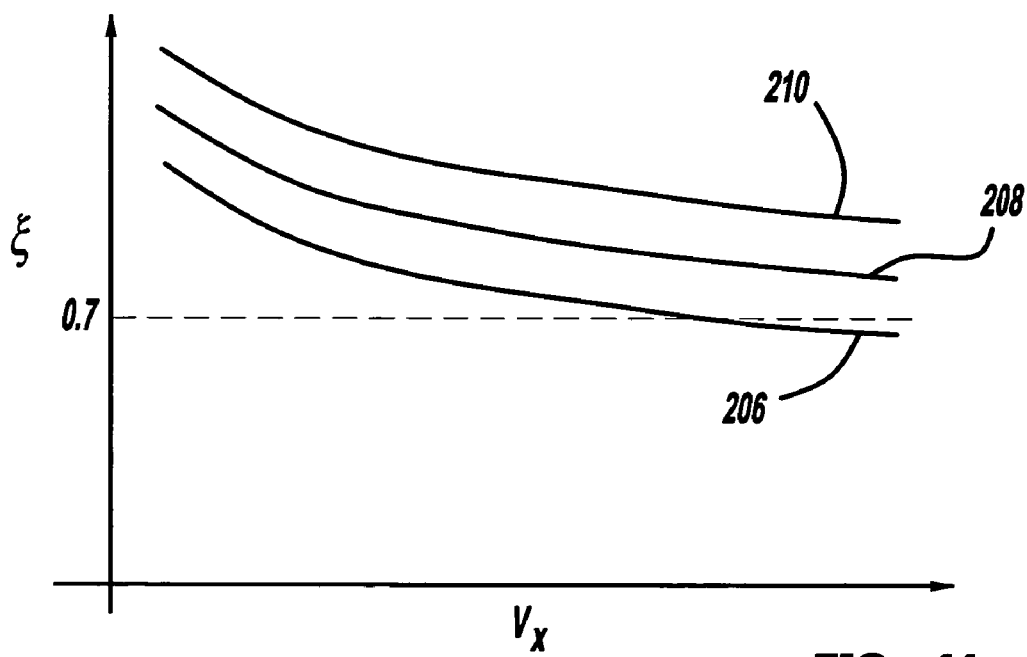
FIG. 11 is a graph with vehicle speed on the horizontal axis and damping ratio on the vertical axis used to determine the damping ratio based on driver skill and vehicle speed.
Figure 12:
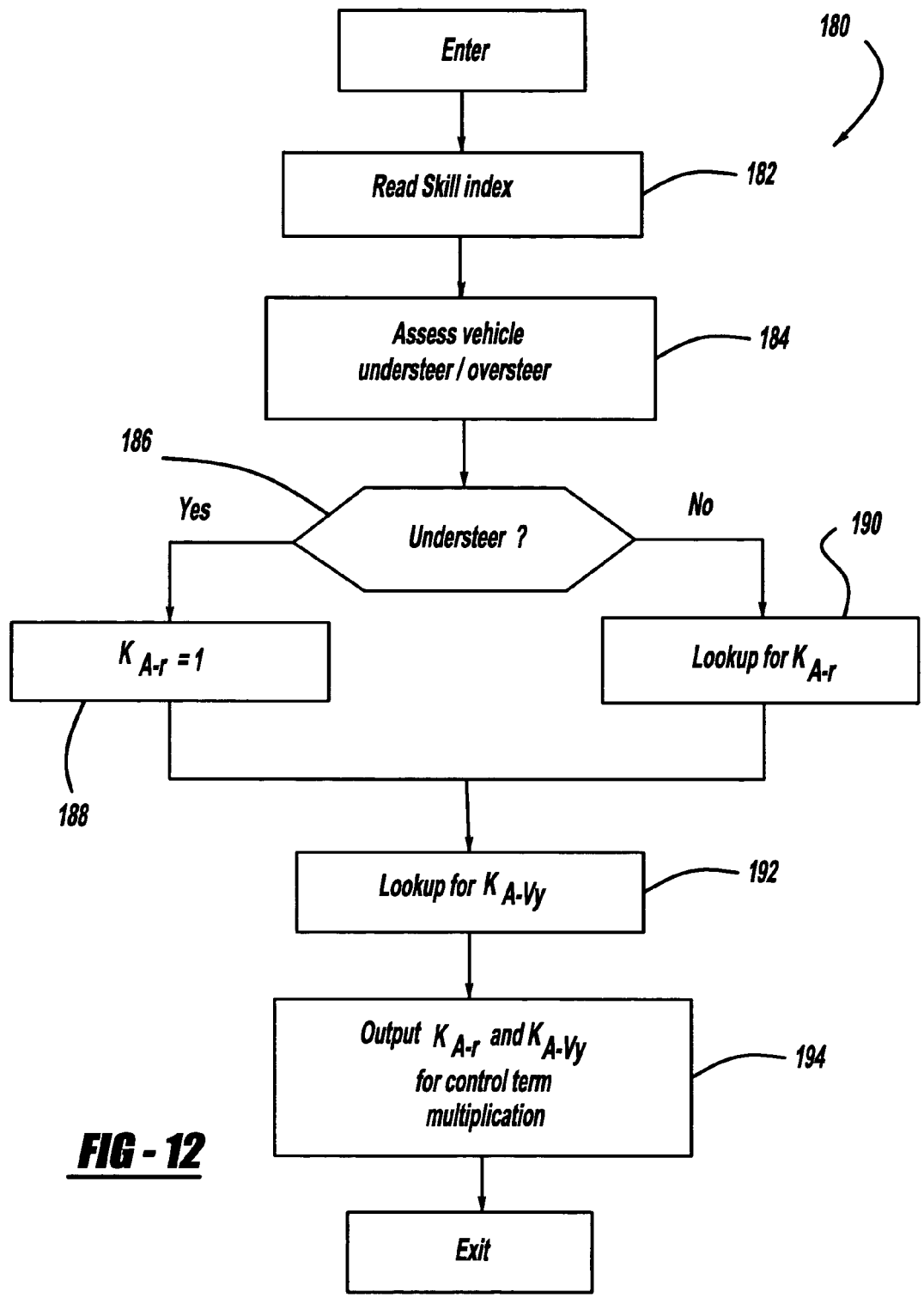
FIG. 12 is a flow chart diagram showing a process for determining the control gains in the vehicle dynamic control computation processor shown in FIG. 4, according to an embodiment of the present invention.

FIG. 9 is a flow chart diagram 160 showing a process for generating the desired yaw rate signal r* from the yaw rate command generator 50 and the desired vehicle side-slip velocity signal $V_y^*$, from the side-slip command generator 52. The control command adaptation processor 70 reads the driver skill level from the driver skill recognition processor 44 at box 162. The algorithm in the control command adaptation processor 70 uses the driver skill level and a look-up table to provide the natural frequency $\omega_n$ at box 164 and the damping ratio $\zeta$ at box 166. FIG. 10 is a graph with vehicle speed on the horizontal axis and natural frequency $\omega_n$ on the vertical axis that includes three graph lines 200, 202 and 204. The graph can be used to determine the natural frequency $\omega_n$ based on vehicle speed and the driver skill level, where the graph line 200 is for an expert driver, the graph line 202 is for an average driver and the graph line 204 is for a low-skill driver. FIG. 11 is a graph with vehicle speed on the horizontal axis and damping ratio $\zeta$ on the vertical axis that includes three graph lines 206, 208 and 210. The graph can be used to determine the damping ratio $\zeta$ based on vehicle speed and the driver skill level, where the graph line 206 is for an expert driver, the graph line 208 is for an average driver and the graph line 210 is for a low skill driver.

The algorithm then uses a look-up table to identify the desired yaw rate multiplier M_r* and the desired side-slip multiplier $M\_V_y^*$, at boxes 168 and 170, respectively. Table I below gives representative examples of these multipliers for the three skill levels, where skill level 1 is for an expert driver, skill level 2 is for an average driver and skill level 3 is for a low-skill driver. The algorithm then outputs the natural frequency $\omega_n$ and the damping ratio $\zeta$ to the dynamic filters 58 and 60 at box 172. The algorithm then outputs the desired yaw rate multiplier M_r* from the filter 58 to the yaw rate command multiplier 72 at box 174 and the desired side-slip multiplier $M\_V_y^*$ from the filter 60 to the side-slip command multiplier 74 at box 176.

TABLE I

| M_r* | 1 | 0.9 | 0.8 |
|---|---|---|---|
| Skill | 1 | 2 | 3 |
| $M\_V_y^*$ | 1 | 0.8 | 0.6 |
| Skill | 1 | 2 | 3 |

FIG. 10 is a flow chart diagram 180 showing a process for providing the yaw rate feedback multiplier $K_{A-r}$ and the lateral dynamic feedback multiplier $K_{A-V_y}$ from the control gain adaptation processor 92. The control gain adaptation algorithm reads the driver skill level from the recognition processor 44 at box 182. The algorithm then determines the vehicle understeer/oversteer coefficient at box 184. The algorithm then determines whether the vehicle is in an understeer condition at decision diamond 186, and if so sets the yaw-rate feedback multiplier $K_{A-r}$ to 1 at box 188. If there is not an understeer condition, then the algorithm goes to a look-up table to provide the yaw-rate feedback multiplier $K_{A-r}$ at box 190 based on the driver skill level. Table II below gives representative values of the multiplier $K_{A-r}$ for the three skill levels referred to above. The algorithm then goes to a look-up table to determine the lateral dynamics feedback multiplier $K_{A-V_y}$ at box 192 based on the skill level, which can also be obtained from Table II. The algorithm then outputs the multipliers $K_{A-r}$ and $K_{A-V_y}$ to the multipliers 94 and 96, respectively, at box 194.

TABLE II

| $K_{A-r}$ | 1 | 1.2 | 1.5 |
|---|---|---|---|
| Skill | 1 | 2 | 3 |
| $K_{A-V_y}$ | 1 | 1.3 | 1.6 |
| Skill | 1 | 2 | 3 |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle stability enhancement system for providing vehicle stability control for a vehicle, said system comprising:
   a driver skill recognition processor for providing a driver skill level signal indicative of the driving skill of a driver driving the vehicle;
   a dynamic command generator responsive to vehicle operation signals and the driver skill level signal, said dynamic command generator generating a desired yaw rate signal and a desired side-slip signal, wherein the dynamic command generator includes a yaw rate command generator and a side-slip command generator, said yaw rate command generator including a first filter responsive to a steady-state yaw rate signal and using a damping ratio and a natural frequency to filter the steady-state yaw rate signal, said side-slip command generator including a second filter responsive to a steady-state side-slip signal and using the damping ratio and the natural frequency to filter the steady-state side-slip signal, said dynamic command generator further including a control command adaptation processor responsive to the driver skill level signal, where the control command adaptation processor changes the damping ratio and the natural frequency in the first and second filters depending on the driver skill level signal; and
   a dynamic control computation processor responsive to the driver skill level signal, the desired yaw rate signal, the desired side-slip signal, a measured yaw rate signal and a measured side-slip signal, said dynamic control computation processor generating a stability control signal for controlling the vehicle.

2. The system according to claim 1 wherein the driver skill recognition processor uses a driver model and vehicle parameters to determine the driver skill level signal.

3. The system according to claim 2 wherein the parameters include a steering gain factor and a time delay factor.

4. The system according to claim 2 wherein the driver model provides a model output that is an estimation of vehicle and driver responses based on vehicle and driver input data and an estimation error based on a vehicle response and a measured response.

5. The system according to claim 4 wherein the parameters are updated if the estimation error is greater than a predetermined threshold.

6. The system according to claim 2 wherein the driver model includes a driver dynamics model and a vehicle dynamics model.

7. The system according to claim 2 wherein the driver model includes a cross-over model.

8. The system according to claim 1 wherein the dynamic control computation processor generates a first error signal as the difference between the desired yaw rate signal and the measured yaw rate signal and a second error signal as the difference between the desired side-slip signal and the measured side-slip signal, said dynamic control computation processor including a first look-up table that provides a yaw rate gain signal in response to the yaw rate error signal and a second look-up table that provides a side-slip gain signal in response to the side-slip error signal, said dynamic control processor further including a first multiplier that multiplies the yaw rate error signal times the yaw rate gain signal to generate a yaw rate stability signal and a second multiplier that multiplies the side-slip error signal times the side-slip gain signal to generate a side-slip stability signal, said dynamic control computation processor further including a control gain adaptation processor responsive to the driver skill level signal and generating a yaw rate multiplier factor and a side-slip multiplier factor, said dynamic control computation processor further including a third multiplier that multiplies the yaw rate stability signal times the yaw rate multiplier factor to generate a modified yaw rate stability signal and a fourth multiplier that multiplies the side-slip stability signal times the side-slip multiplier factor to generate a modified side-slip stability signal, said dynamic control computation processor further including an adder that adds the modified yaw rate stability signal and the modified side-slip stability signal to generate the stability control signal.

9. The system according to claim 8 wherein the control gain adaptation processor determines whether the vehicle is in an understeer condition before it determines the yaw rate multiplier factor, and sets the yaw rate multiplier factor to 1 if the vehicle is in an understeer condition.

10. The system according to claim 1 wherein the vehicle operation signals include a vehicle speed signal and a hand-wheel angle signal.

11. A vehicle stability enhancement system for providing vehicle stability control for a vehicle, said system comprising:
   a driver skill recognition processor for providing a driver skill level signal indicative of the driving skill of a driver driving the vehicle, said driver skill recognition processor using a driver model and vehicle parameters to generate the driver skill level signal;
   a dynamic command generator responsive to a vehicle speed signal, a hand-wheel angle signal and the driver skill level signal, said dynamic command generator generating a desired yaw rate signal and a desired side-slip signal, said dynamic command generator including a yaw rate command generator and a side-slip command generator, said yaw rate command generator including a first filter responsive to a steady-state yaw rate signal and using a damping ratio and a natural frequency to filter the steady-state yaw rate signal, said side-slip command generator including a second filter responsive to a steady-state side-slip signal and using the damping ratio and the natural frequency to filter the steady-state side-slip signal, said dynamic command generator further including a control command adaptation processor responsive to the driver skill level signal, where the control command adaptation processor changes the damping ratio and the natural frequency in the first and second filters depending on the driver skill level signal; and
   a dynamic control computation processor responsive to the driver skill signal, the desired yaw rate signal, the desired side-slip signal, a measured yaw rate signal and a measured side-slip signal, said dynamic control computation processor generating a first error signal as the difference between the desired yaw rate signal and the measured yaw rate signal and a second error signal as the difference between the desired side-slip signal and the measured side-slip signal, said dynamic control computation processor including a first look-up table that provides a yaw rate gain signal in response to the yaw rate error signal and a second look-up table that provides a side-slip gain signal in response to the side-slip error signal, said dynamic control processor further including a first multiplier that multiplies the yaw rate error signal times the yaw rate gain signal to generate a yaw rate stability signal and a second multiplier that multiplies the side-slip error signal times the side-slip gain signal to generating a side-slip stability signal, said dynamic control computation processor further including a control gain adaptation processor responsive to the driver skill level signal and generates a yaw rate multiplier factor and a side-slip multiplier factor, said dynamic control computation processor further including a third multiplier that multiplies the yaw rate stability signal times the yaw rate multiplier factor to generate a modified yaw rate stability signal and a fourth multiplier that multiplies the side-slip stability signal times the side-slip multiplier factor to generate a modified side-slip stability signal, said dynamic control computation processor further including an adder that adds the modified yaw rate stability signal and the modified side-slip stability signal to generate a stability control signal.

12. The system according to claim 11 wherein the parameters include a steering gain factor and a time delay factor.

13. The system according to claim 11 wherein the driver model provides a model output that is an estimation of vehicle and driver responses based on vehicle and driver input data and an estimation error based on a vehicle response and a measured response.

14. The system according to claim 11 wherein the control gain adaptation processor determines whether the vehicle is in an understeer condition before it determines the yaw rate multiplier factor, and sets the yaw rate multiplier factor to 1 if the vehicle is an understeer condition.

15. A vehicle stability enhancement system for providing vehicle stability control for a vehicle, said system comprising:

a driver skill recognition processor for providing a driver skill level signal indicative of the driving skill of a driver driving the vehicle;

a dynamic command generator responsive to vehicle operation signals and the driver skill level signal, said driver skill level signal changing a damping ratio and a natural frequency in a filter in the dynamic command generator so as to adjust the vehicle operation signals depending on the drivers skill level provided b the drivers skill level signal, said dynamic command generator generating at least one desired vehicle response signal; and a dynamic control computation processor responsive to the driver skill level signal, the at least one desired vehicle response signal and at least one measured vehicle response signal, said dynamic control computation processor adjusting a multiplication factor for the at least one vehicle response signal, said dynamic control computation processor generating a stability control signal for controlling the vehicle.

16. The system according to claim 15 wherein the at least one desired vehicle response signal is a desired yaw rate signal and a desired side-slip signal and the at least one measured vehicle response signal is a measured yaw rate signal and a measured side-slip signal.

17. The system according to claim 15 wherein the driver skill recognition processor uses a driver model and vehicle parameters to determine the driver skill level signal.

18. The system according to claim 17 wherein the parameters include a steering gain factor and a time delay factor.

19. The system according to claim 17 wherein the driver model provides a model output that is an estimation of vehicle and driver responses based on vehicle and driver input data and an estimation error based on a vehicle response and a measured response.

* * * * *